US010592926B2

(12) United States Patent
Salmon et al.

(10) Patent No.: US 10,592,926 B2
(45) Date of Patent: Mar. 17, 2020

(54) SYSTEM AND METHOD FOR MULTIMEDIA CONTENT COMPOSITION

(71) Applicant: NBCUniversal Media, LLC, New York, NY (US)

(72) Inventors: Michael Clive Salmon, London (GB); Sheau Bao Ng, Wayland, MA (US)

(73) Assignee: NBCUniversal Media, LLC, New York, NY (US)

( * ) Notice: Subject to any disclaimer, the term of this patent is extended or adjusted under 35 U.S.C. 154(b) by 590 days.

(21) Appl. No.: 14/575,211

(22) Filed: Dec. 18, 2014

(65) Prior Publication Data
US 2016/0180379 A1    Jun. 23, 2016

(51) Int. Cl.
G06Q 30/02 (2012.01)
(52) U.S. Cl.
CPC ................ G06Q 30/0255 (2013.01)
(58) Field of Classification Search
CPC .................................... G06Q 30/0255
See application file for complete search history.

(56) References Cited

U.S. PATENT DOCUMENTS

| 9,172,943 B2* | 10/2015 | Friedman | H04N 21/4307 |
| 9,219,945 B1* | 12/2015 | Velummylum | H04N 21/4622 |
| 2006/0074750 A1* | 4/2006 | Clark | G06Q 30/0264 705/14.61 |
| 2008/0016114 A1* | 1/2008 | Beauregard | G11B 27/005 |
| 2009/0144797 A1* | 6/2009 | Wang | H04N 21/4331 725/131 |
| 2011/0023063 A1* | 1/2011 | McDonough | H04N 21/4316 725/46 |
| 2013/0141530 A1* | 6/2013 | Zavesky | H04N 21/21805 348/43 |
| 2015/0020086 A1* | 1/2015 | Chen | H04N 21/44218 725/12 |

* cited by examiner

Primary Examiner — William A Brandenburg
(74) Attorney, Agent, or Firm — Fletcher Yoder, P.C.

(57) ABSTRACT

In one embodiment, a method of blending multimedia with a multimedia composition system may include generating a swap list by identifying potential match points of objects, scenes, or assets, in a multimedia template that are capable of being replaced with personal multimedia assets (PMA) in a user's collection, generating a composition list by designating particular PMA from the PMA in the user's collection to replace at least a portion of the objects, scenes, or assets in the multimedia template identified in the swap list by matching metadata of the particular PMA with metadata of the objects, scenes, or assets in the multimedia template, and composing blended multimedia using the composition list by swapping the objects, scenes, or assets in the multimedia template with the particular PMA matched based on the respective metadata.

21 Claims, 8 Drawing Sheets

| 30 ROCK | | |
|---|---|---|
| SCENE 2 | | |
| LIZ LEMON'S FLAT | | |

| SWAP OUT OBJECT | PLACEMENT | SWAP IN OBJECT |
|---|---|---|
| SOUND TRACK | OPENING SCENE, LIZ PLAYING MUSIC | MUSIC FILE FROM USERS MUSIC COLLECTION |
| PHOTOGRAPH 1 | SHELF BACK WALL | MALE FACE FROM USERS PHOTO COLLECTION - FACING FORWARD |
| PHOTOGRAPH 2 | PHOTO FRAME STAGE RIGHT | ANY PHOTO FROM USERS COLLECTION |
| LAMP | COFFEE TABLE CENTRE | COMMERCIAL OPPORTUNITY (INSERT PRODUCT UNIQUE IDENTIFIER AND RETAILER URL) |
| COUCH | MIDDLE OF THE ROOM | COMMERCIAL OPPORTUNITY (INSERT PRODUCT UNIQUE IDENTIFIER AND RETAILER URL) |
| CUSHIONS | ON COUCH | COMMERCIAL OPPORTUNITY (INSERT PRODUCT UNIQUE IDENTIFIER AND RETAILER URL) |
| THROW | ON COUCH | COMMERCIAL OPPORTUNITY (INSERT PRODUCT UNIQUE IDENTIFIER AND RETAILER URL) |
| RUG | FLOOR FRONT OF STAGE | COMMERCIAL OPPORTUNITY (INSERT PRODUCT UNIQUE IDENTIFIER AND RETAILER URL) |
| TV | CORNER STAGE RIGHT | COMMERCIAL OPPORTUNITY (INSERT PRODUCT UNIQUE IDENTIFIER AND RETAILER URL) |

FIG. 10

SYSTEM AND METHOD FOR MULTIMEDIA CONTENT COMPOSITION

BACKGROUND

The present disclosure relates generally to multimedia content composition, and, more particularly, to composing multimedia content that is suited to a user's needs.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Commercial multimedia content may include, but is not limited to, advertisements, television shows, movies, news, sports, music, imagery, and the like, that are commercially produced versus multimedia content produced by consumers. Commercial multimedia content delivered to users is typically generalized and directed to large groups of people. Even specifically targeted advertisements are somewhat generalized to appeal to a large audience within a demographic. For example, television commercials are often developed in an attempt to appeal to a particular type of audience, such as people interested in a certain type of television show (e.g., golf enthusiasts) or people that typically watch television during a particular timeslot. Once developed, the television commercials are then delivered in a manner designed to reach the target audience (e.g., during commercial breaks of a relevant television show). As another example, Internet-based advertisements may be directed to particular users based on user data (e.g., previous Internet searches). However, in these traditional techniques, the actual commercial multi-media provided is generally the same for all users that receive it. Indeed, it is now recognized that the adaptation of actual content to personalize the content for individual users is not commonly performed today. In general, traditional systems for providing commercial multi-media do not alter the content of the commercial multi-media once it has been compiled and prepared for distribution, although certain minor supplements may be made to it (e.g., adding closed captioning, language options, and the like). It is now recognized that it is desirable to provide more personalized commercial multi-media to appeal to users.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a method of blending multimedia with a multimedia composition system may include generating a swap list by identifying potential match points of objects, scenes, or assets, in a multimedia template that are capable of being replaced with personal multimedia assets (PMA) in a user's collection, generating a composition list by designating particular PMA from the PMA in the user's collection to replace at least a portion of the objects, scenes, or assets in the multimedia template identified in the swap list by matching metadata of the particular PMA with metadata of the objects, scenes, or assets in the multimedia template, and composing blended multimedia using the composition list by swapping the objects, scenes, or assets in the multimedia template with the particular PMA matched based on the respective metadata.

In one embodiment, a tangible, non-transitory computer-readable medium storing computer instructions thereon is disclosed. The computer instructions, when executed by a processor, may be configured to generate a swap list by identifying potential match points of objects, scenes, or assets, in a multimedia template that are capable of being replaced with personal multimedia assets (PMA) in a user's collection, generate a composition list by designating particular PMA to replace at least a portion of the objects, scenes, or assets in the multimedia template identified in the swap list by matching metadata of the particular PMA with metadata of the objects, scenes, or assets in the multimedia template, and compose blended multimedia using the composition list by swapping the objects, scenes, or assets in the multimedia template with the particular PMA matched based on the respective metadata.

In one embodiment, an electronic device may include a means for generating a swap list by identifying potential match points of objects, scenes, or assets, in a multimedia template that are capable of being replaced with personal multimedia assets (PMA) in a user's collection. The electronic device may also include a means for generating a composition list by determining particular PMA of the PMA in the user's collection to replace at least a portion of the objects, scenes, or assets in the multimedia template identified in the swap list by matching metadata of the particular PMA with metadata of the objects, scenes, or assets in the multimedia template, and a means for composing blended multimedia using the composition list by swapping the objects, scenes, or assets in the multimedia template with the particular PMA matched based on the respective metadata.

DRAWINGS

These and other features, aspects, and advantages of the present disclosure will become better understood when the following detailed description is read with reference to the accompanying drawings in which like characters represent like parts throughout the drawings, wherein:

FIG. 10 illustrates a swap list, in accordance with an embodiment; and

DETAILED DESCRIPTION

Figure 1:
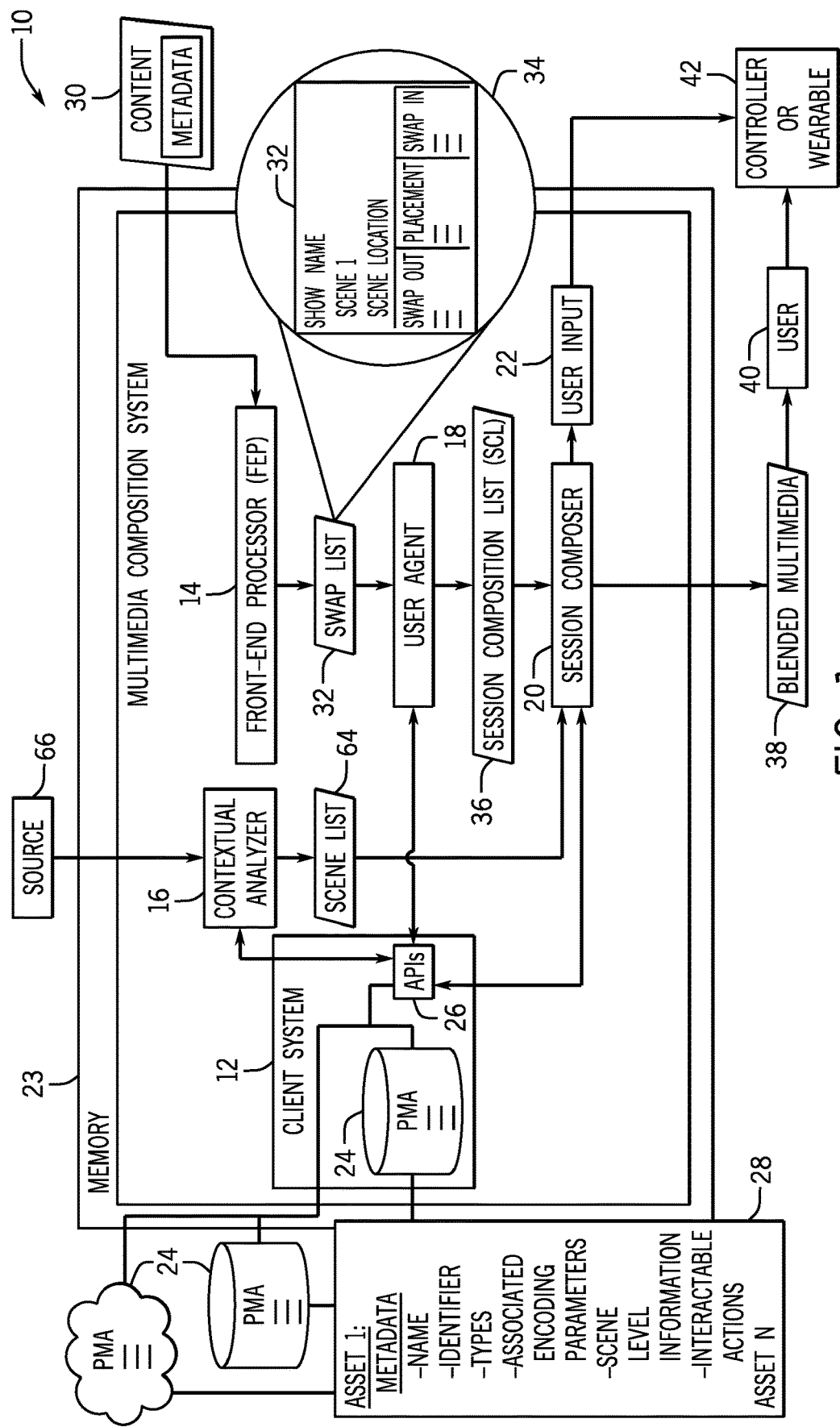
FIG. 1 illustrates a multimedia composition system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

Multimedia content may refer to content that uses a combination of different forms. For example, multimedia content may include a combination of video, text, audio, still images, animation, interactivity, or some combination thereof. Multimedia content may be provided to user's using a multimedia template. The multimedia template may define a multimedia environment including objects, scenes, and/or assets with associated metadata composed at specific locations or slots. In accordance with the present disclosure, multimedia templates may be personally tailored using personal multimedia assets (PMA) of a user's library collection of content. In some embodiments, the PMA in the user's library collection of content may include owned multimedia content and rented multimedia content, including commercial multimedia content, to which the user has proper manipulation rights. For example, various multimedia content assets, including commercial ones, may be rented, thereby providing temporary manipulation rights, and incorporated into another commercial multimedia content. Personalized multimedia content may be generated that includes the user's PMA inserted into at least a portion of the slots in a multimedia template. Example forms of multimedia templates may include commercial multimedia content and virtual environments.

As mentioned above, commercial multimedia content, such as television shows, movies, advertisements, or the like, rarely, if ever, are tailored to a user's particular interests or desires. Generally, commercial multimedia content is recorded, rendered, and delivered to be played by an information content processing device, such as a set-top box, unaltered. In some scenarios, advertisements may be placed in specifically reserved time slots and the content may be supplemented with closed captions, but the actual multimedia content (e.g., characters, audio, objects) remains unchanged. However, it is now recognized that there exists an opportunity to personalize the commercial multimedia content or generate virtual environments composed of personal multimedia content through the use of highly detailed, descriptive metadata included in both the commercial multimedia content and personal multimedia content. Indeed, multimedia content can be generated such that it includes highly detailed, descriptive metadata. For instance, a video of an office may include, in its metadata, detailed information related to objects (e.g., object type, object dimensions), camera angles, lighting, etc. within the video. Leveraging that metadata to personalize the commercial multimedia content with personal multimedia content may be highly desirable. In addition, in some scenarios, where commercial multimedia content is not used, it may be desirable to provide some other type of personalized multimedia content to the user.

Accordingly, the present disclosure relates to systems and methods to compose multimedia that is suited to the user's personal information and preferences. The composed multimedia may include PMA from the user's own library collection of content. The PMA may include still images (two-dimensional (2D) images), three-dimensional (3D) models, videos, animations, audio, text, and so forth. Also, each PMA may include rich metadata describing the details of the content. Metadata generally refers to the data providing information about one or more aspects of the data. For example, a still image may include metadata that describes the size of the image, the color depth of the image, resolution of the image, when and where the image was created, lighting in the image, camera angle, among other data. In some embodiments, the PMA metadata may include a descriptive name, identifier, type of content (audio, video, text, still image, etc.), associated encoding parameters (resolution, bitrate, codec, duration, etc.), scene-level information (objects, location, orientation, lighting, etc.), interact-able actions (play sound, animate, change color, etc.). Metadata may assist in multimedia content composition by allowing content to be found by relevant criteria, identifying content, matching similar content together, distinguishing dissimilar content, giving location information to properly map content, among many other things discussed below.

In some embodiments, using the metadata of the PMA may enable generating uniquely personalized multimedia content to be delivered to a user that consists of blended commercial multimedia content with PMA and generating virtual environments including PMA based on the user's personal information and preferences. The techniques may identify aspects of a multimedia template suitable for swapping with the user's PMA and match the metadata of those aspects with the metadata of the PMA to generate a composition list. In some embodiments, the composition list may include the object, scene, or asset to replace, the PMA to include in the multimedia template, the location of where to place the PMA, or some combination thereof. Example composition lists may include a session composition list and a scene list, as described in detail below. The composition list may be used to compose blended multimedia.

For instance, it may be desirable to play an audio file from the user's library collection along with, or in addition to (via audio blending), the commercial multimedia content. In another example, PMA may include a photo of the user's child's favorite toy (e.g., a bunny rabbit). The metadata for the PMA may include the toy's nickname ("Bunny") and a 3D model of the toy (a stuffed bunny rabbit). While the child's favorite cartoon is playing on the television, the techniques may identify the main character in the cartoon, which may not be a bunny rabbit at all, and replace the main character with the 3D model and texture mapping of the child's favorite toy. In addition, the techniques may replace audio and any caption data with the word "Bunny." Thus, the user's PMA and the commercial multimedia content may be composed in blended multimedia at an object level, rather than a whole frame level. Blending the commercial multimedia content with the user's PMA in this way may enhance the user's enjoyment of the multimedia content.

In some embodiments, when commercial multimedia content is not used, virtual environments may be generated with the user's PMA based on personal information and preferences. The PMA may be selected based on information in the PMA's metadata. The personal information and preferences may include browsing and purchase histories, social media interactions, viewing/listening habits, and psychological profiling, to name a few. For example, the techniques may generate a nightclub scene, the interior of which is selected using an understanding of the destinations to which the user has traveled and the user's taste in décor/design determined from browsing and/or purchase history, "likes" on social media, and so forth. Also, the nightclub may be playing music from the user's library collection and may be populated with representations of people from the user's social profile. In some embodiments, techniques including facial/neural scanning, galvanic skin response (GSR), heart rate, or other indicators of mood/pleasure may be used to detect the user's enjoyment of the virtual environment. Based on the detected enjoyment level, the virtual environment may be updated to include more preferable PMA (e.g., music, lighting, crowd) or a new virtual environment may be created more suited to the user's mood. Through various methods (e.g., machine learning, artificial intelligence, neural networks, optimization) the system may derive correlations between the user's mood and actions, including the likely enjoyment of certain content and/or the propensity of the user to purchase certain advertised goods.

With the foregoing in mind, FIG. 1 illustrates a multimedia composition system 10, in accordance with an embodiment. In some embodiments, the system 10 may include the following components: a client system 12, a contextual analyzer 16, a front-end processor (FEP) 14, a user agent 18, a session composer 20, and a user input 22. As discussed in more detail below, the system 10, including the components 12, 16, 14, 18, 20 and 22, may be stored on one or more tangible, non-transitory computer-readable medias (memory 23). The components may be implemented as software modules or circuitry configured to provide varying functionalities. Using a loosely coupled architecture by encapsulating varying functionalities in separate modules may enhance the system's scalability and maintenance. In some embodiments, the multimedia composition system 10 may include software objects as the components in an object-oriented architecture.

The client system 12 may manage and maintain one or more repositories 24 storing the user's PMA data. As illustrated, the repositories 24 may be located internally to the system 10, externally to the system 10, such as on a connected device, or on the "cloud." The client system 12 may expose the data in the repositories 24 through one or more application-programming interfaces (APIs) 26. Exposing the data in the repositories may refer to enabling functions, such as create, read, update, or delete using predefined methods in the APIs 26. In some embodiments, the APIs 26 may include hypertext transfer protocol (HTTP) web services that adhere to representational state transfer (REST) architecture constraints. The REST constraints may include using a base universal resource indicator, an Internet media type for data, standard HTTP methods, hypertext links to reference a state, hypertext links to reference related resources, and the like. The HTTP methods used to implement the REST APIs 26 may include GET, PUT, POST, and DELETE methods, among others. For example, other software modules may interface with the APIs 26 to fetch data from the repositories 24 using the GET method, replace data in the repositories 24 using the PUT method, create a new entry of data in the repositories 24 using the POST method, and delete data from the repositories 24 using the DELETE method.

The PMA stored in the repositories 24 may include rich (highly detailed and descriptive) metadata that describes the detail of the content. As shown in the exploded view 28 of the data in the repositories 24, any number of PMAs may be stored and may include at least metadata related to a descriptive name ("Bunny" from the example above, "Photo from Niagara Falls Holiday trip," etc.), an identifier (which may not need to be universally unique as long as the identifier is resolvable within the context of the system 10), a type (audio, video, text, still image, 3D model, etc.), associated encoding parameters (resolution, bitrate, codec, duration, etc.), scene-level information (objects, location, orientation, lighting, etc.), interact-able actions (play sound, animate, change color, etc.).

In some embodiments, the PMA may be preloaded in the repositories 24 that are local and/or external to the client system 12. The repositories may be updated periodically or continuously with additional PMA as it becomes available. For example, if a user purchases a toy at a store, a digital 3D model, 2D image file, or the like, may accompany the toy on a disc or flash drive for the user to download to the repositories 24. Alternatively or additionally, the purchase of the toy may be accompanied by a password and a link to a website where the user can access the 3D model, 2D image file, and other digital content. In some embodiments, the APIs 26 may access information on cloud environments where data is stored on remote servers. Example cloud environments may include social media providers where the user may provide personal information related to relationship status, occupation, family, birthday, gender, and preferences related to music, television, movies, sports, among myriad other information. Additionally, the cloud environment, such as the social media provider, may store photographs uploaded by the user depicting the user's family, pets, trips, random events, car, house, and the like.

The PMA may be obtained by using a scanner to scan an object into a digital file image or a 3D model may be generated. It should be appreciated that various types of equipment (e.g., scanner, 2D or 3D printer, camera, smart phone, webcam) used by the user to obtain image data (2D, 3D), and some or all of the equipment may be configured to enable the user to select various parts of the object that are important. For example, a child's favorite toy may be a stuffed bunny and the bunny's left leg may have a stitch that is broken, thereby exposing stuffing from a small hole. The user may select the bunny's left leg when the image data is being generated to ensure that the hole in the left leg with exposed stuffing is represented properly. In some embodiments, the image data for a particular PMA may be provided by a third party source (e.g., server, database).

As previously discussed, the PMA may be used in at least two contexts: when commercial multimedia content 30 is used and when commercial multimedia content 30 is not used. In embodiments where commercial multimedia content 30 is used, the commercial multimedia content 30 may be delivered via any suitable means such as cable, satellite, and/or digitally (e.g., the Internet). The commercial multimedia content 30 may include television shows (e.g., cartoons, situational comedies, dramas), sporting events, movies, advertisements, and the like. The commercial multimedia content 30 may also include highly detailed and descriptive metadata describing data present in the commercial multimedia content 30, such as the objects in a video, the camera angle in the video, the lighting in the video, the audio in the video, and so forth. The metadata may include any relevant information that facilitates substitution, such as position information, beginning time and ending time of music in a video, and the like.

The multimedia composition system 10 may receive the commercial multimedia content 30 at the front-end processor 14. In some embodiments, the front-end processor 14 may analyze the commercial multimedia content 30 and the metadata to identify potential match points for desirable PMA. For each identified scene, object, or other asset in the commercial multimedia content 30, the front-end processor 14 may generate a swap list 32. Generating the swap list 32 may include parsing a metadata table included with the commercial multimedia content 30 and separating out the elements included in the metadata table. As shown in the exploded view 34, the swap list 32 may include a title of the commercial multimedia content 30, a scene number, a scene location, an object, scene, or asset to swap out from the commercial multimedia content 30, a placement of the object, scene, or asset, and an object, scene, or asset to swap in, among others. For example, an object to swap out from a scene may be a soundtrack that is placed at the opening scene of a video, and the object to swap in at that placement may be a music file from the user's music collection. In another example, the object to swap out from the scene may be a photograph of a person that is placed on a shelf along a back wall of a room in the scene, and the object to swap in at that placement may be a photograph of a person from the user's photograph collection.

The swap list 32 may be sent to the user agent 18, which interfaces with the front-end processor 14. The user agent 18 may use internal logic, including any suitable user interface technology, to analyze the swap list 32 and determine which identified objects, scenes, or other assets in the commercial multimedia content 30 match which of the PMA. The user agent 18 may match the metadata included in the commercial multimedia content 30 with the metadata of the PMA. In some embodiments, the metadata matching may include binary matching, such that either the PMA metadata includes an attribute similar to the commercial multimedia content 30 metadata or does not. Additionally or alternatively, the user agent 18 may match attributes between the commercial multimedia content 30 metadata and the PMA metadata, and the PMA that matches the most attributes may be selected as the swap in object, or the PMA metadata that matches a threshold amount of attributes with the commercial multimedia content 30 metadata may be selected as the object to swap in. If there is a tie between one or more PMA, a weighting function may be used to provide higher weights to certain attributes to facilitate a tiebreaker. In some embodiments, matching techniques from commonly used online content search and recommendation engines can be adapted to be used in the matching of PMA to commercial content 30. Accordingly, the user agent 18 may call functions of the APIs 26 to query the repositories 24 and/or the cloud environment to obtain the PMA and their respective metadata.

The object to swap in may be selected from the PMA stored in the repositories 24 and/or in the cloud based upon the matching performed by the user agent 18, and a session composition list 36 may be generated by the user agent 18 and passed on to the session composer 20. The session composition list 36 may indicate the object to swap out from the commercial multimedia content 30, the placement of the object, and the PMA to swap in to replace the previous object (e.g., including in which repository 24 the PMA is stored or where to locate the PMA on the cloud environment), among other information. The session composer 20 may take the commercial multimedia content 30, and its associated metadata, and use the session composition list 36 from the user agent 18 to substitute and/or blend the selected PMA with the commercial multimedia content 30 to obtain blended multimedia 38. Moreover, as discussed in detail below, upon receipt of the session composition list 36, the session composer 20 may fetch the needed PMA, compose objects (3D model rendering, including skinning), identify visual objects of commercial content (per metadata), graphically blend/overlay objects, separate audio (dialog from background music), identify caption/text fields and substitution as appropriate, render the full multimedia for output, and set triggers for user interactions, if applicable. The multimedia composition system 10 may output the blended multimedia 38 to a user 40 for consumption.

In some embodiments, the PMA that is composed in the blended multimedia 38 may include a set of actions that the user can perform on the PMA to elicit a unique response. For example, a PMA may include a 3D model of a bunny rabbit toy owned by a child and a set of actions, such as poking the bunny rabbit by clicking on the bunny rabbit 3D model using a controller 42 (e.g., wearable, mouse, electronic pointer), and the bunny rabbit may respond by making a preset noise uniquely associated with the real bunny rabbit toy that the child owns. The set of actions may be stored in the metadata as the interact-able actions previously discussed. Various other actions that may occur when a user clicks on the PMA may include changing color, animating a certain movement, and so forth. The user input 22 component of the multimedia composition system 10 may monitor the controller 42 and trigger an associated action based upon how the user 40 interacts with the blended multimedia 38.

Figure 2:
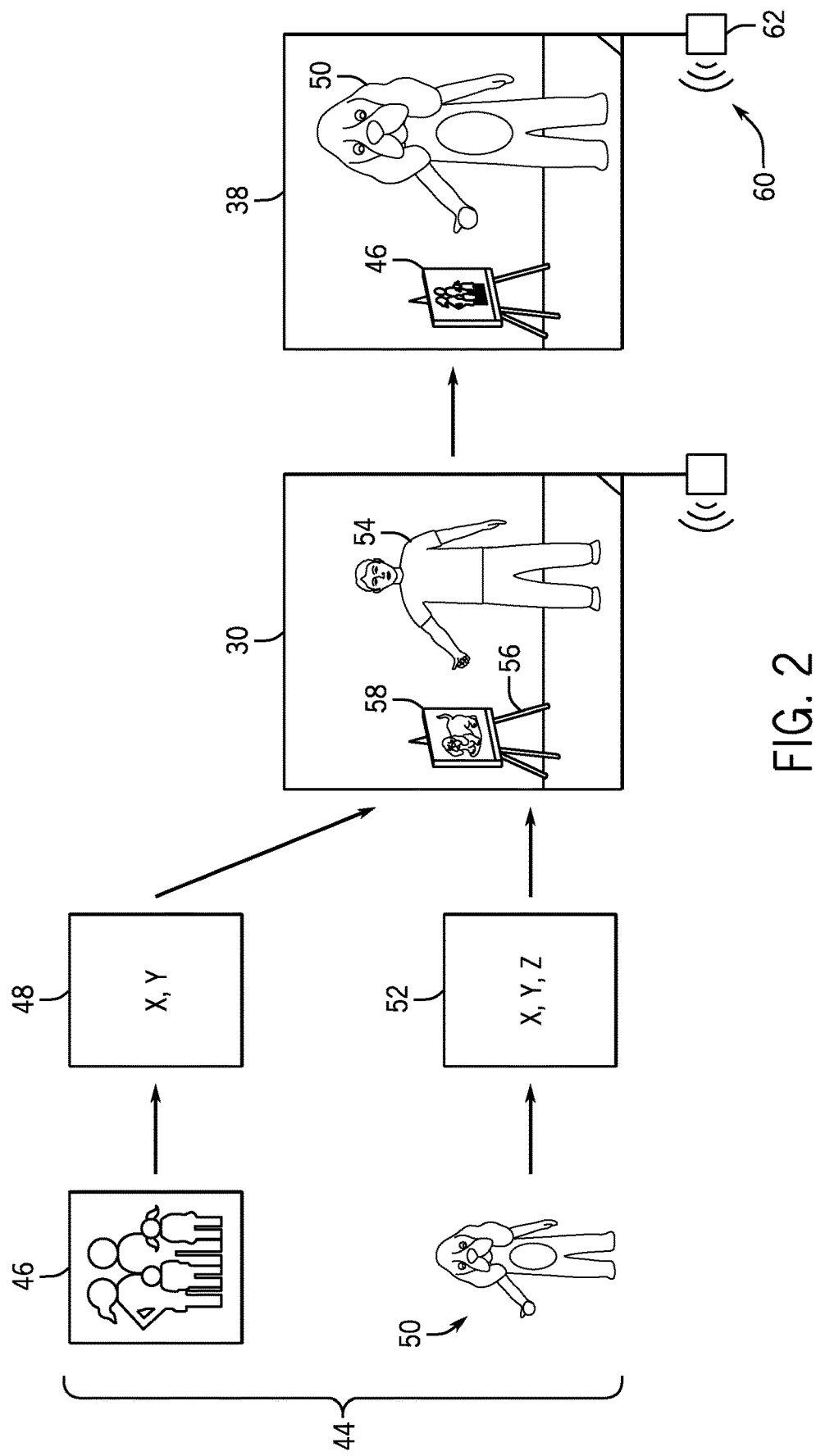
FIG. 2 illustrates a user's personal multimedia assets (PMA) composed with commercial multimedia content, in accordance with an embodiment.

To illustrate, FIG. 2 depicts a user's personal multimedia assets 44 (PMA) composed with commercial multimedia content 30, in accordance with an embodiment. The PMA 44 may include a file image 46 of a family of three people, including the user, his spouse, and their child. The file image 46 may be 2D and include x and y dimensions 48. Further, the PMA 44 may include a 3D model 50 of a bunny rabbit toy with x, y, and z dimensions 52 that represents the user's child's favorite toy. In the illustrated embodiment, the commercial multimedia content 30 depicts a character 54 in a television cartoon waving at the screen and standing next to an easel 56 with a picture 58 of the sun resting on it. It should be noted that the character 54 is a 3D model and that the picture 58 is a 2D file image. The commercial multimedia content 30 may include metadata that is received by the front-end processor 14, which generates a swap list 32 by identifying potential match points in the commercial multimedia content 30. In this example, the front-end processor 14 may separate the elements of the metadata and generate a swap list 32 that identifies the character 54 as an object to potentially swap out placed at the center of the screen, the easel 56 as an object to potentially swap out placed near a back wall on the left of the screen, and the picture 58 of the sun resting on the easel 56 to potentially swap out resting on the easel 56.

Once the swap list 32 is generated, the front-end processor 14 may pass the swap list 32 to the user agent 18, which may match the identified objects with the PMA 44 in the repositories 24 and/or in the cloud environment. The user agent 18 may determine that the metadata for these types of objects (e.g., 2D file image and 3D model) match for the PMA 44 and certain objects in the commercial multimedia content 30. Specifically, the user agent 18 may generate a session composition list 36 that includes the character 54 as an object to swap out at the center of the screen and the 3D model 50 of the bunny rabbit as the object to swap in, and the picture 58 of the sun as an object to swap out resting on the easel 56 and the 2D file image 46 of the family as the object to swap in. The user agent 18 may then send the session composition list 36 to the session composer 20, which may blend the selected PMA with the commercial multimedia content 30 to generate blended multimedia 38. Further, triggers may be set for certain detected user 40 interactions, such as a sound 60 (e.g., unique sound associated with the real bunny rabbit toy that the child owns) that plays from a speaker when the user 40 clicks (via the controller 42) on the 3D model 50 of the bunny rabbit.

Returning to the multimedia composition system 10 in FIG. 1 and focusing now on the second context where commercial multimedia content 30 is not used, in some embodiments, the multimedia composition system 10 may be configured to generate virtual environments based on the user's personal information and preferences, as previously discussed. The contextual analyzer 16 may generate a scene list 64 that includes PMA reflective of the user's personal information and preferences based on information received from a number of sources, as well as input (signals) received indicative of the user's enjoyment and/or mood from the controller, such as a wearable including a watch, glasses, headband, bracelet, and/or sensors. In some embodiments, the scene list 64 may be generated by using a swap list 32 that identifies objects, scenes, and/or assets in the virtual environments that are capable of being replaced with the user's PMA.

The sources 66 and/or PMA may include browsing and purchase histories on the Internet, social media interactions on the Internet, viewing habits of television shows, movies, etc. on a set-top box and/or on the Internet, listening habits from a media player software application on a computer and/or on the Internet, and/or psychological profiling. The sources 66 may provide advertisements to place in the virtual environment that include a display priority flag set to ensure that the advertisements are included in the scene list 64. The advertisements with the display priority flag set may override any PMA selected at certain positions in the virtual environment. The scene list 64 may include a list of selected PMA (including all metadata) and advertisements to include in the virtual environment and the location of where to place the PMA and advertisements.

Also, the contextual analyzer 16 may receive information from other sources 66, such as third party companies, that provide advertisements targeted to the user's preferences. In some embodiments, the information may include metadata about the display priority flag. The display priority flag may be a Boolean flag and initially set to "false." However, if the display priority flag is set to "true," then the advertisement may override the other PMA that the contextual analyzer 16 had originally selected to be displayed at a particular location. The display priority flag may be modified by the source 66 or contextual analyzer 16 based on various factors including likelihood of the advertisement to enhance the user's propensity to make a purchase, similarity to items browsed for or shopped for in the past, and so forth. For example, a billboard located in a scene may display the advertisement with the display priority flag set to true. In this way, the source 66 may override the contextual analyzer 16.

The contextual analyzer 16 may use the information from the sources 66 to generate a virtual environment scene most appropriate to the user's mood and tailored with advertisements that are targeted towards the user's preferences to enhance the propensity of purchasing the particular good and/or service. The user's mood and/or enjoyment level of a particular virtual environment may be detected by the contextual analyzer 16 by using facial/neural scanning, galvanic skin response (GSR), heart rate, or other like indicators of mood/pleasure. The multimedia composition system 10 may detect the user's enjoyment and either update the virtual environment to include more preferable assets (music, lighting, crowd) or create a new virtual environment more suited to the user's mood.

As previously noted, through various methods (e.g., machine learning, artificial intelligence, neural networks, optimization) the system may derive correlations between the user's mood and actions, including the likely enjoyment of certain content and/or the propensity of the user 40 to purchase certain advertised goods. For example, using machine learning the multimedia composition system 10 may monitor the user's interaction with the virtual environment and correlate those actions to the user's mood derived by using a detected heart rate, GSR, facial scanning (e.g., smiling, frowning), neural scanning (e.g., increased dopamine levels), and so forth. To illustrate, at a particular time of day, the contextual analyzer 16 may determine that the user 40 is happy because the user 40 is smiling, has an elevated heart rate, and/or an elevated level of dopamine in the user's brain. While happy at this time of day, the user 40 may have selected a number of songs to play in the virtual environment. The contextual analyzer 16 may correlate the songs the user 40 selected to the user's mood (happy) at this time of day, and, in the future, the contextual analyzer 16 may select these songs to play when the user 40 is determined by the contextual analyzer 16 to be happy at this time of day.

Further, the contextual analyzer 16 may correlate a certain mood with an enhanced propensity to purchase goods. For example, the contextual analyzer 16 may detect the user's mood, as noted above, and monitor the user's actions to see whether the user 40 is more or less likely to purchase goods in that mood. Further, the contextual analyzer 16 may determine what kinds of goods the user 40 prefers to purchase in that mood. To illustrate, the contextual analyzer 16 may determine that the user 40 is sad at a certain time of day due to information detected by the controller 42, such as the user 40 frowning or not smiling, an elevated heart rate, and/or normal levels of dopamine in the user's brain. Then, the contextual analyzer 16 may correlate that the user prefers to browse for and rent movies, in particular, comedies, online while sad. This information may be made available to third party sources 66, when allowed, and those sources 66 can provide advertisements for comedic movies when the contextual analyzer 16 detects that the user is sad. In some embodiments, the advertisements may be sent to the contextual analyzer 16 with the display priority flag set to "true" so the advertisements will be blended in with the selected PMA.

As the contextual analyzer 16 continues to determine correlations between mood/enjoyment, PMA/advertisements, and user interactions, the contextual analyzer 16 can provide virtual environments that are more closely fit to the user's preferences by solving an optimization problem. That is, the contextual analyzer 16 may attempt to find the most optimal solution out of all possible solutions by analyzing the metadata of the PMA to determine which PMA most closely fits the user's preferences based on the correlations. For example, certain metadata may be assigned higher weights if it is determined that the PMA displayed is preferred during certain moods of the user 40, time of day, and so forth, or whether the advertisements may enhance a propensity to purchase goods and/or services during certain moods of the user 40, time of day, and so forth. In some embodiments, the PMA with higher weighted metadata may be selected when certain moods are detected as the most optimal solution. If there are any advertisements provided with the display priority flag set to true, then those advertisements may override the PMA selected and be added to the scene list 64.

Once the contextual analyzer 16 generates the scene list 64, the scene list 64 may be passed to the session composer 20. The session composer 20 may fetch the PMA that is identified in the scene list 64, compose all the objects, including 3D model rendering, graphically blend/overlay objects at desired locations, insert and blend audio (music, dialog), render full multimedia for output, and set triggers for user interactions, if applicable (according to the interactable actions metadata). The blended multimedia 38 (e.g., virtual environment) may be output for user 40 consumption.

Figure 3:
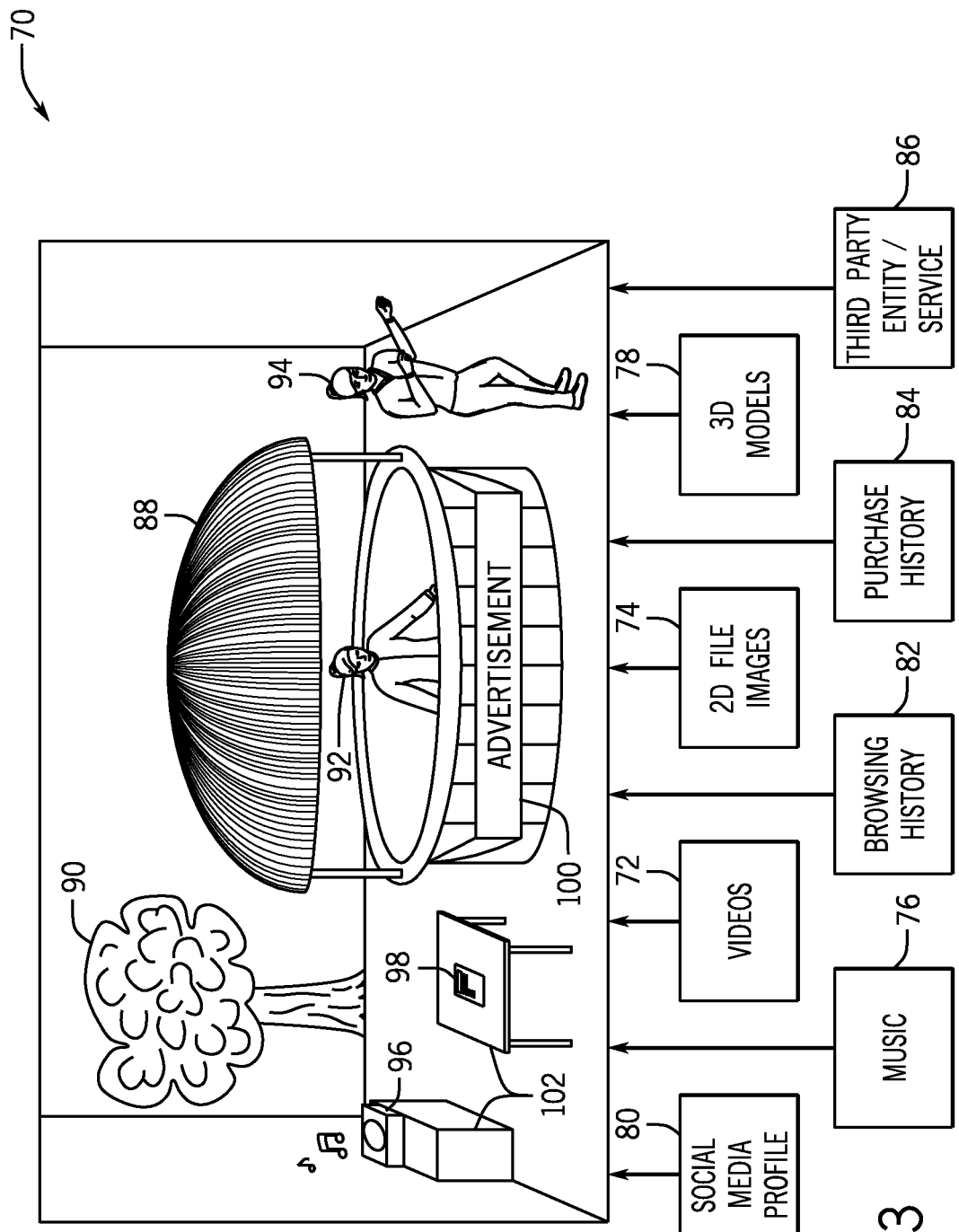
FIG. 3 illustrates a virtual environment generated based on a user's personal multimedia assets (PMA) and advertisements, in accordance with an embodiment.

An example of a virtual environment 70 generated by the multimedia composition system 10 is illustrated in FIG. 3. The virtual environment 70 may be generated based on a user's personal media assets (PMA) and advertisements, as previously discussed. The depicted virtual environment 70 represents a beach scene, the layout of which may be created using an understanding of destinations traveled to, taste in décor/design and includes music from the user's collection and populated with people that reflect the user's social profile. The PMA may have been selected by the contextual analyzer 16 from the repositories 24 and/or the cloud environment 24 based on personal information provided by the repositories 24, one or more sources 66, user preference determined by past correlations, and the like. Example PMA from the user's library collection that may be blended include videos 72 (e.g., self recorded videos using a smart phone or digital camera, movies, television series), 2D file images 74 (e.g., photographs uploaded from a smart phone or downloaded from a digital camera or the Internet), music 76 (e.g., downloaded using a media player), 3D models 78 of objects (e.g., people, toys, furniture, buildings, trees). The personal information may be obtained from sources 66 including, but not limited to, the user's social media profile 80, online browsing history 82, online purchase history 84. Further, the advertisements may be provided by a third party entity/service 86, such as an advertisement lead generation service. For example, using the user's social media profile 80, the contextual analyzer 16 may generate 3D models of various people associated with the user to populate the virtual environment 70. Also, based on the user's browsing history 82 and purchase history 84, the third party entity/service 86 may generate an advertisement tailored to enhance the user's purchasing propensity (e.g., by displaying a product the user has previously searched for or bought). In some embodiments, the third party entity/service 86 may be one of the sources 66 previously discussed.

In the illustrated virtual environment 70, the beach scene includes a beach bar 88, one or more palm trees 90, a bar tender 92, one or more people 94, a music player 96, a newspaper 98, an advertisement 100, and tables 102. The actual layout of the beach bar 88, palm trees 90, ocean (not shown), and so forth may be arranged based on destinations that the user has traveled to determined by analyzing the user's photographs, previous flight itineraries, and/or from the user's browsing history of beach destinations. The style of tables 102 and music player 96 may be determined based on the user's taste in décor/design, browsing history, purchase history, and the like. For example, the music player 96 may be a record player if the contextual analyzer 16 determines that the user has recently purchased a record player or a number of records, the tables 102 may be styled like furniture the user has recently purchased or searched for on the Internet, and so forth. Using the PMA, the contextual analyzer 16 may play music on the music player 96 ("record player") from the user's music 76 collection that the user prefers. Further, the music 76 may be tailored to the user's mood as detected by the contextual analyzer 16. The people 94 and/or the bartender 92 included in the virtual environment 70 may be 3D models or visual representations of people that are associated with the user's social media profile 80. In this way, the virtual environment 70 may be populated with people the user likes to be around. Additionally, the advertisement 100 may be provided by the third party entity/service 86 based on the user's browsing history 82, purchase history 84, video 72 preferences, music 76 preferences, past correlations of the user's propensity to purchase certain goods when in certain moods, or the like.

As previously discussed, the user may be able to interact with various PMA included in the virtual environment 70. These virtual interactions may be depicted as physical interactions and may be described as such herein. For example, the user 40 may pick up the newspaper 98 to read the latest updates in the user's social media outlets, and the user may be able to perform actions or update the social media outlets, all while listening to their favorite music playing in the background. To that end, the user 40 may interact with the music player 96 by changing the music 76 that is playing. In some embodiments, the people 94 included in the virtual environment 70 may play prerecorded sounds or respond dynamically when clicked on by the user 40. Meanwhile, the contextual analyzer 16 may be determining correlations based on the user 40 interactions and the user's detected mood/enjoyment from detected input sent via the controller 42. If the contextual analyzer 16 determines that the user is unsatisfied with the virtual environment 70, the virtual environment 70 may be updated to include more preferable PMA (music, lighting, people) or a different virtual environment 70 may be generated anew with a different scene. To the contrary, if the contextual analyzer 16 determines that the user 40 is satisfied, the contextual analyzer 16 may determine positive correlations between the PMA in the virtual environment 70 and the user's enjoyment. It should be understood that any suitable virtual environment may be generated with any scene, such as a nightclub scene, a wedding scene, a sporting event scene, an office scene, and so forth.

Figure 4:
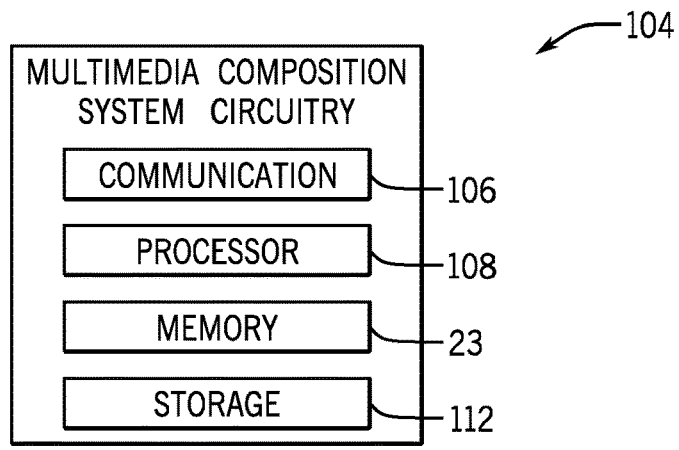
FIG. 4 is a block diagram of media composition system circuitry, in accordance with an embodiment.

FIG. 4 is a block diagram of media composition system circuitry 104 (referred to as "circuitry" herein), in accordance with an embodiment. The multimedia composition system 10 may be implemented as software, firmware, hardware, or some combination thereof, included in the circuitry 104. As shown, the circuitry 104 may include communication circuitry 106, a processor 108, the memory 23, and a storage 112. The communication circuitry 106 may be a wireless or wired (Ethernet) communication component that may facilitate communication between the multimedia composition system 10 and any external repositories 24, cloud environments 24, sources 66, commercial multimedia content 30 provider, the Internet, the intranet, and so forth. The communication circuitry 106 may enable communicating wirelessly using any suitable wireless standard (e.g., Wi-Fi, ZigBee®, Bluetooth®) to perform the disclosed techniques. In some embodiments, the multimedia composition system 10 may be implemented as computer instructions (code) stored on one or more tangible, non-transitory computer-readable medias (memories 23) and executed by one or more processors 108, such as microprocessors.

The memory 23 and the storage 112 may be any suitable articles of manufacture that can serve as media to store computer instructions, data, or the like. These articles of manufacture may represent tangible, non-transitory computer-readable media (i.e., any suitable form of tangible memory or storage) that may store the computer instructions used by the processor 108 to perform the presently disclosed techniques. The memory 23 and the storage 112 may also be used to store PMA. The circuitry 104 may be included in a digital media player, such as a set-top box, a dongle (e.g. high-definition multimedia interface (HDMI)), or the like.

Figure 5:
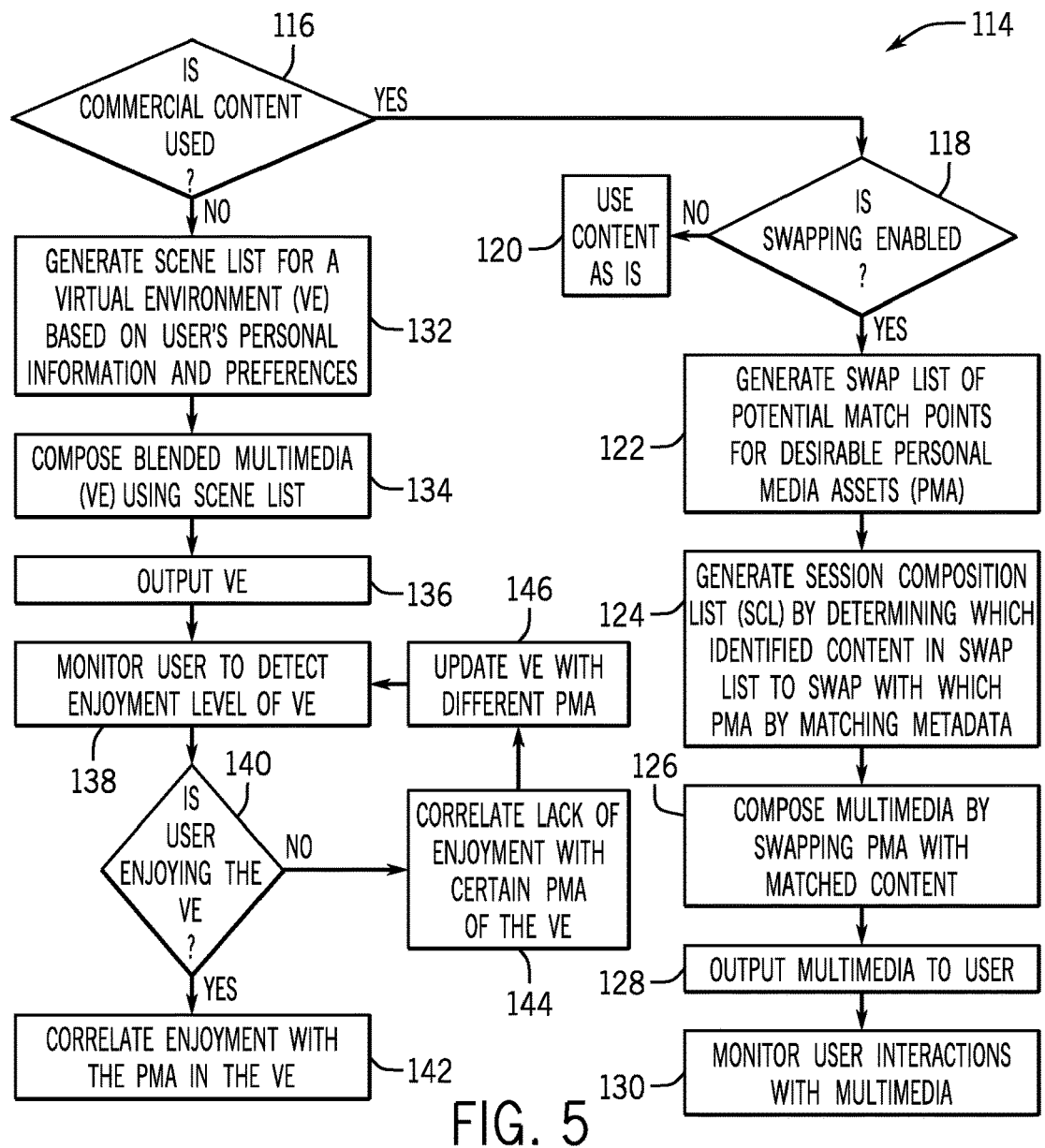
FIG. 5 illustrates a flow diagram of a process suitable for composing multimedia content based on a user's needs, in accordance with an embodiment.

FIG. 5 illustrates a flow diagram of a process 114 suitable for composing multimedia content based on a user's needs, in accordance with an embodiment. The process 114 may be implemented as computer instructions stored on the one or more tangible, non-transitory computer-readable medias (memories 23) and executable by the one or more processors 108. The process 114 may include determining whether commercial multimedia content 30 is being used to compose blended multimedia 38 (decision block 116). If commercial multimedia content 30 is being used, the process 114 may include determining whether swapping is enabled on the multimedia composition system 10 (decision block 118). The commercial content providers may have business arrangements with users that either permit or prohibit swapping of content objects for a particular commercial content. Enabling or disabling functions can be implemented in one or more techniques based on input from such arrangements. The remainder of this description assumes that the commercial content provider has allowed object swapping of the commercial multimedia content. If swapping is not enabled, the process 114 may include using the commercial multimedia content 30 as received (process block 120). However, if swapping is enabled, the process 114 may include generating a swap list 32 of potential match points for desired personal multimedia assets (PMA) (process block 122). In some embodiments, when the user stores the commercial multimedia content 30 (e.g., using a DVR), electronically purchased via an online content provider, and so forth, the generated swap list 32 may be stored alongside the commercial multimedia content 30 (e.g., as a file attachment to the content) for future use.

The process 114 may also include generating a session composition list 36 by determining which identified commercial multimedia content in the swap list 32 to swap with which PMA by matching metadata (process block 124). For example, the user agent 18 may select between a number of different PMA with metadata indicating a still image for an object in the commercial multimedia content 30 with matched metadata indicating a still image. The still image in the commercial multimedia content 30 may be a picture of people and other metadata of the object may indicate that the subject matter of the object is "people." When making the determination between which still image PMA to use, the user agent 18 may match the metadata for the type of object as still image and also match metadata for the subject matter as "people" and select a PMA that matches both while ignoring the PMA that does not match both.

The process 114 may also include composing blended multimedia 38 by swapping PMA with matched content (process block 126), outputting the blended multimedia 38 for user 40 consumption (process block 128), and monitoring the user 40 interactions with the multimedia 38 (process block 130). As previously discussed, the front-end processor 14 may generate the swap list 32, the user agent 18 may generate the session composition list 36 based on the swap list 32 and matched metadata of the PMA, and the session composer 20 may use the session composition list 36 to compose the blended multimedia 38.

If commercial multimedia content 30 is not used to generate blended multimedia 38, then the process 114 may include generating a scene list 64 for a virtual environment based on the user's personal information and preferences (process block 132), composing the blended multimedia 38 (e.g., virtual environment) using the scene list 64 (process block 134), outputting the virtual environment 38 to the user 40 (process block 136), and monitoring the user 40 to detect an enjoyment level of the virtual environment 38 (process block 138). The process 114 may then include determining whether the user 40 is enjoying the virtual environment 38 (decision block 140). If the contextual analyzer 16 determines that the user 40 is enjoying the virtual environment 38, then the contextual analyzer 16 may correlate the user's mood/pleasure with the PMA/advertisements in the virtual environment 38 (process block 142). If, on the other hand, the contextual analyzer 16 determines that the user 40 is not enjoying the virtual environment 38, a correlation may be determined between a lack of enjoyment (e.g., mood) and certain PMA/advertisements (process block 144). Then, the process 114, specifically, the contextual analyzer 16, may update the virtual environment 38 with different PMA and/or advertisements based on past correlations of user enjoyment, likely enjoyment of content, and/or propensity to purchase advertised goods (process block 146), and the process 114 may return to monitoring the user 40 to detect the enjoyment level with the virtual environment 38 (process block 138). In some embodiments, process block 146 may include generating a different scene list 32 that includes the different PMA and/or advertisements, which is used to compose a new virtual environment 38.

More specifically, regarding process block 132, the scene list 64 may include PMA from the repositories 24 and cloud environment and/or advertisements from the sources 66. The scene list 64 may further include the placement of the PMA and/or advertisements in the virtual environment 38. It should be noted that, in some embodiments, the PMA (scene setting, lighting, music, video, people) selected may be based on the user's interest as previously indicated according to past correlations between the user's mood/pleasure. Also, in some embodiments, the PMA may be selected based on likelihood of enjoyment as determined by analyzing usage statistics, viewing statistics, and so forth. Further, the advertisements that are blended into the virtual environment may be provided by the sources 66 based on the user's browsing history, purchasing history, propensity to purchase goods while in a certain mood, and so forth.

Figure 6:
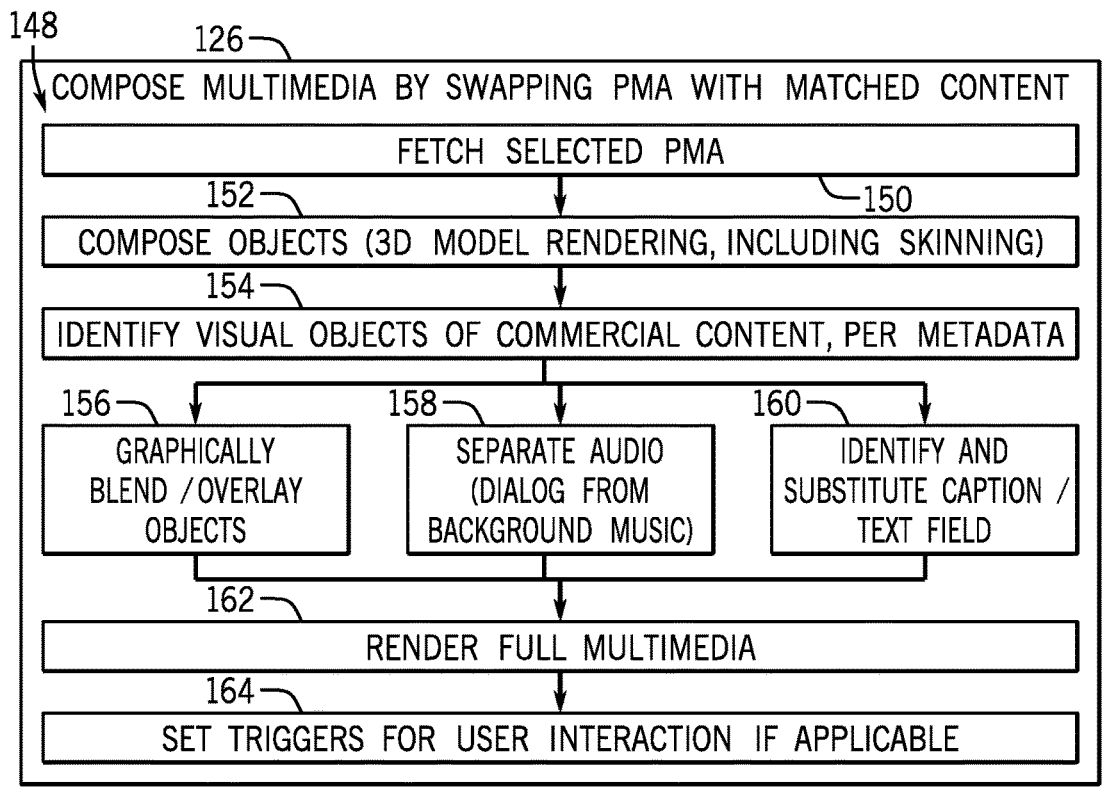
FIG. 6 illustrates a flow diagram of a process suitable for composing multimedia by swapping personal multimedia assets (PMA) with matched commercial multimedia content executed by a session composer, in accordance with an embodiment.

FIG. 6 illustrates a flow diagram of a process 148 suitable for composing multimedia by swapping personal multimedia assets (PMA) with matched commercial multimedia content 30 executed by the session composer 20, in accordance with an embodiment. The process 148 may be included as part of process block 126 from process 114 illustrated in FIG. 5. Also, the process 148 may be implemented as computer instructions stored on the one or more memories 23 and executable by the one or more processors 108. The process 148 may include fetching PMA selected in the session composition list 36 using the APIs 26 (process block 150). In some instances, the APIs 26 may execute GET functions to retrieve the PMAs from the repositories 24 or from the cloud environment. Once the PMAs are fetched, the process 148 may include composing the objects. Each object may include a data file (2D image file, 3D image file) that is retrieved using the APIs 26. The 3D image files may include 3D models, 3D animations, and/or 3D project files. The 3D models may include metadata related to the geometry of a model (polygons and vertices) used to create the model's shape, as well as metadata related to textures (e.g., skin or mesh), lighting, shading, camera angles, rotation, interact-able actions, and so forth. In some embodiments, the 2D image files may be converted into 3D image files (3D models) by the session composer 20. Indeed, composing the objects may include 3D model rendering, including skinning (process block 152).

In some embodiments, certain metadata in the various PMA selected may differ from each other and from the visual objects identified in the commercial multimedia content 30. For example, the lighting metadata may be very bright for a piece of furniture in a room in a still image PMA, whereas the lighting in the scene of the commercial multimedia content 30 is fairly dim. In such cases, the session composer 20 may alter the lighting metadata of the still image PMA to match the lighting in the scene of the commercial multimedia content 30, alter the lighting metadata of all the objects in the scene to match the lighting metadata of the still image PMA, or a combination thereof. It should be understood that this meshing of metadata between PMA and objects of the commercial multimedia content 30 may be performed for any of the metadata (e.g., camera angle, resolution, brightness).

After the PMA objects identified in the session composition list 36 have been composed, the session composer 20 may identify visual objects, audio objects, and caption/text data of the commercial multimedia content 30, per metadata (process block 154). For example, for metadata including a type of object, such as still image, audio, video, and so forth, the session composer 20 may identify the visual objects in the commercial multimedia content 30 by each respective type of object (metadata). It should be noted that identifying the visual objects of the commercial multimedia content 30 may include obtaining location placement information of the visual objects. Then, in process block 154, the session composer 20 may graphically blend/overlay the composed PMA objects with the identified visual objects using the location placement information of the visual objects in the commercial multimedia content 30. The identified visual objects in the commercial multimedia content 30 may be replaced with the composed PMA objects and result in new blended multimedia 38.

Further, in process block 158, the session composer 20 may separate the audio in the commercial multimedia content 30. In some embodiments, separating the audio may include separating the dialog from the background music (music, extraneous noises, sound effects, etc.). Once separated, the dialog and/or background music may be replaced with PMA identified in the session composition list 36. For example, identified PMA may include the user's favorite song that replaces the opening theme song of a television show. Next, the process 148 may include identifying and substituting caption/text fields (process block 160). For instance, in a child's favorite cartoon, any caption data that includes the name of a character replaced with a 3D model of the child's favorite toy bunny rabbit may be replaced with the word "Bunny," or any suitable name the child has given to the toy.

Then, the session composer 20 may render the full blended multimedia 38 (process block 162). However, prior to outputting the blended multimedia 38, the session composer 20 may set triggers in the blended multimedia 38 for any objects with metadata that includes interact-able actions, such as playing a sound, turning a color, or animating a certain movement (process block 164). For example, the swapped toy bunny rabbit may respond to a user 40 (child) key press or similar input using the controller 42 to make a sound that is uniquely associated with the real toy bunny rabbit that the child owns. After the triggers are set for the appropriate objects in the blended multimedia 38, the blended multimedia 38 may be output for user 40 consumption.

Figure 7:
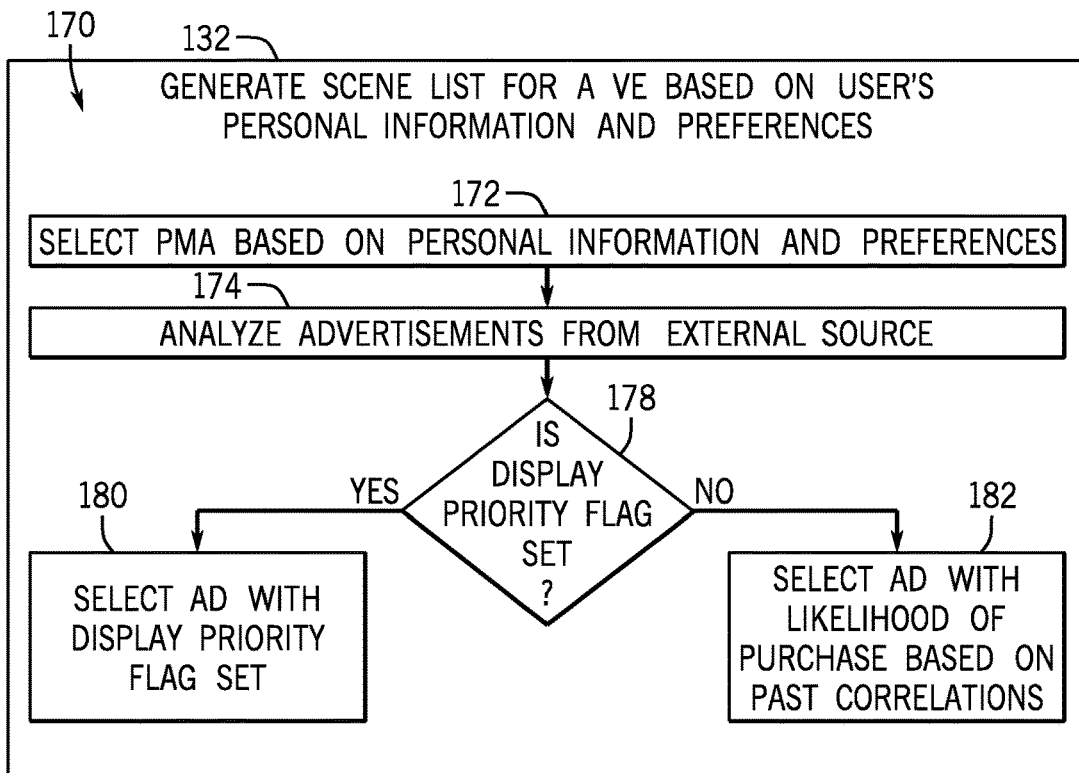
FIG. 7 illustrates a flow diagram of a process suitable for generating a scene list for a virtual environment based on a user's personal information and preferences, in accordance with an embodiment.

FIG. 7 illustrates a flow diagram of a process 170 suitable for generating a scene list 64 for a virtual environment based on a user's personal information and preferences, in accordance with an embodiment. Process 170 may be included as part of process block 132 from process 114 illustrated in FIG. 5 and may be performed by the contextual analyzer 16. The process 170 may be performed when commercial multimedia content 30 is not used. Also, the process 170 may be implemented as computer instructions stored on the one or more memories 23 and executable by the one or more processors 108. The process 170 may include selecting personal multimedia assets (PMA) based on personal information and preferences (process block 172). As previously discussed, in some embodiments, the contextual analyzer 16 may select PMA based on likely user 40 enjoyment of the content based on past correlations of mood and user interactions, usage statistics, viewing statistics, and so forth. For example, if the contextual analyzer 16 previously drew a correlation that the user 40 prefers certain people to be represented in the virtual environment when the user 40 is happy, then when the contextual analyzer 16 detects that the user 40 is happy again, those people may be composed into the virtual environment. Also, the PMA selection may be based on the user's browsing and purchase histories, social media interactions and profile, viewing/listening habits, and psychological profiling.

Then, in process block 174, the contextual analyzer 16 may analyze the advertisements provided by sources 66. This analysis may include determining whether a display priority flag is set to true or not null (decision block 178). The display priority flag is generally set by the commercial multimedia content providers. In some embodiments, the display priority flag may be changed from "true" to "null" based on business arrangements between the users and the commercial multimedia content providers. If the display priority flag is set to true or not null in some embodiments, then the contextual analyzer 16 must select and substitute the advertisement into the virtual environment at the desired location (process block 180). If there is PMA already selected to be displayed at the desired location, the PMA may be overridden by the advertisement with the display priority set to true or not null. However, if the display priority flag is set to false or null, then the contextual analyzer 16 may select and substitute an advertisement that enhances the purchasing propensity of the user 40 based on past correlations, browsing and purchase history, viewing/listening habits, and so forth. For example, if the contextual analyzer 16 previously drew a correlation between the user listening to classical music when the user is relaxing, then the contextual analyzer 16 may select an advertisement for classical music to play in the virtual environment when the contextual analyzer 16 detects that the user is relaxing (based on heart rate, facial/neural scanning, galvanic skin response (GSR), etc.).

Figure 8:
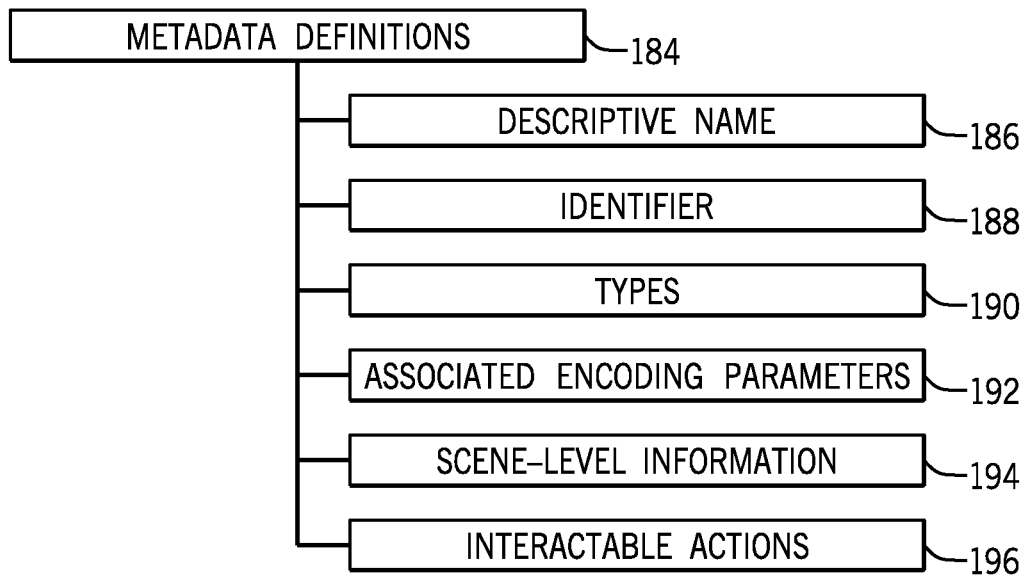
FIG. 8 illustrates a schematic diagram of metadata definitions for personal multimedia assets (PMA), in accordance with an embodiment.

FIG. 8 illustrates a schematic diagram of metadata definitions 184 for personal multimedia assets (PMA), in accordance with an embodiment. A first metadata definition 186 for PMA may include a descriptive name for the PMA. For example, the toy bunny rabbit may be named "Bunny" or a photograph from a trip to Niagara Falls over a holiday may be named "Photo from Niagara Falls Holiday." A second metadata definition 188 may include an identifier. In some embodiments, the identifier may not need to be universally unique as long as it is resolvable within the context of the system. For example, the identifier may be a combination of alphabet characters, numeric characters, special characters, or some combination thereof.

A third metadata definition 190 may include a type of PMA, such as audio, video, text still image, 3D model, and so forth. A fourth metadata definition 192 may include associated encoding parameters. The associated encoding parameters 192 may include resolution, bitrate, codec, duration, and so forth. The resolution may refer to the number of pixels to use for the PMA, measure of digital audio quality, or the like. The bitrate may refer to a number of bits that are processed per unit of time measured using bits per second (bit/s). Also, codec may refer to type of device or computer program used to encode or decode the digital data stream or signal associated with the PMA. Duration may refer to a length of time of an animation or a video, for example.

A fifth metadata definition 194 may include scene-level information. The scene-level information 194 may include objects, location, orientation, lighting, and so forth. The objects may refer to the actual object in the PMA, such as furniture, picture, person, toy, animal, building, and so forth. The location may refer to the placement or position of the object in the scene. The orientation may refer to a description of how the object is placed in the space it is to occupy (scene) and how the object moves in that space. For example, the orientation may indicate how to rotate the object from a reference placement to its current placement. The lighting may refer to the lighting and shading used in the scene and may include the camera angle to use in the scene. For example, PMA including a 3D model of a user's furniture (e.g., a leather couch) may be composed in a scene but the 3D model may include a particular lighting metadata associated with it. In such a scenario, the lighting and shading of the other PMA in the scene may be modified to match the furniture's particular lighting. A sixth metadata definition 196 may include interact-able actions associated with the PMA. The interact-able actions 196 may include playing a sound when the user interacts with the PMA, animating a certain movement or gesture when the user interacts with the PMA, changing color when the user interacts with the PMA in a certain way, and so forth.

Figure 9:
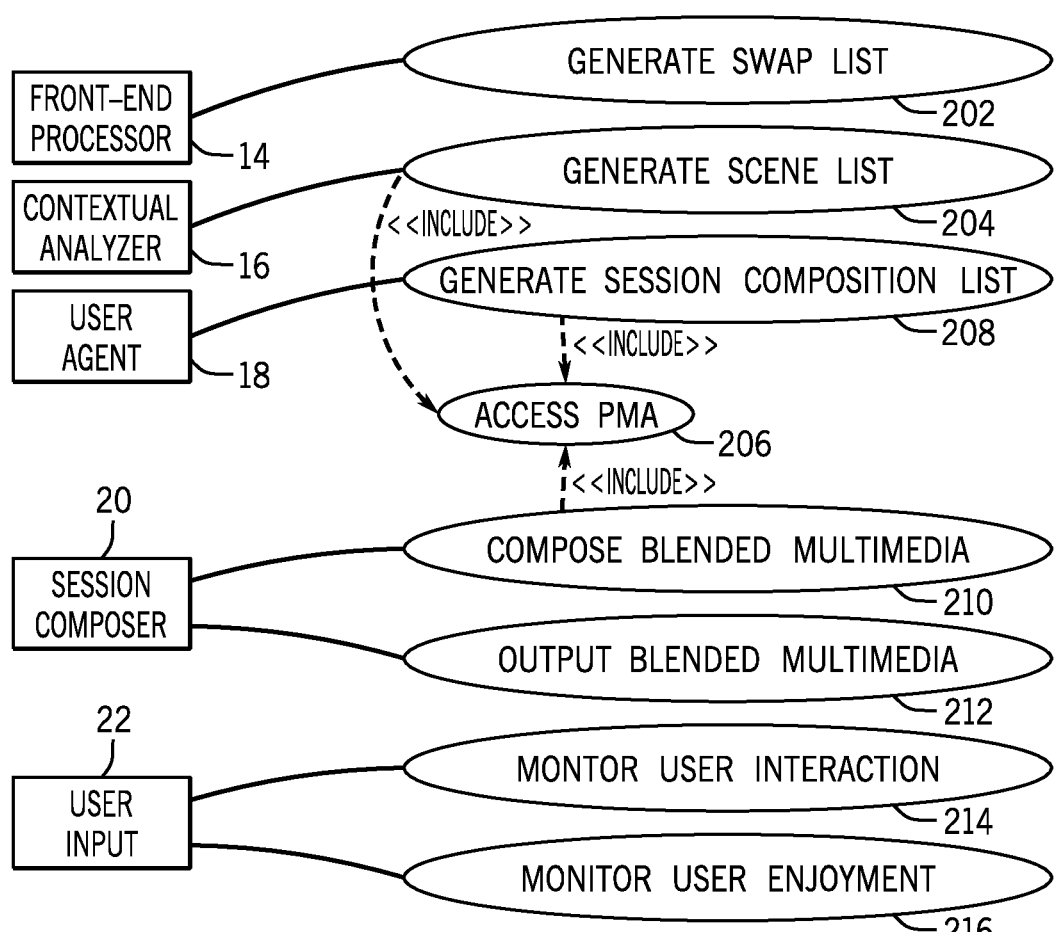
FIG. 9 illustrates a use case diagram for composing multimedia content based on a user's needs, in accordance with an embodiment.

FIG. 9 illustrates a use case diagram 200 for composing multimedia content based on a user's needs. The use case diagram 200 may include several components that perform varying functionality, such as the front-end processor 14, the contextual analyzer 16, the user agent 18, the session composer 20, the user input 22, among others. The front-end processor 14 may perform the function of generating the swap list 32 (use case block 202). As previously discussed, generating the swap list 32 may include receiving the commercial multimedia content 30, with its metadata, and identifying potential match points for swappable PMA based on the metadata. In some embodiments, when the user stores commercial multimedia content (e.g., using a DVR), electronically purchased via an online content provider, and so forth, the generated swap list 32 may be stored alongside the commercial multimedia content (e.g., as a file attachment to the content) for future use. The contextual analyzer 16 may be associated with the use case of generating the scene list 64 (use case block 204). Generating the scene list 64 may include selecting PMA based on the user's mood, past correlations, browsing and purchasing history, advertisements sent from other sources 66, user preferences, and/or other personal information. Further, upon detecting the user's enjoyment level of the virtual environment, the contextual analyzer 16 may modify the PMA selected in the scene list 64 to something more preferable. Thus, as shown, generating the scene list 64 (use case block 204) may include accessing the PMA (use case block 206) from the repositories 24 and/or the cloud environment.

The user agent 18 component may perform the function of generating the session composition list 36 (use case block 208). Generating the session composition list 36 may include matching the metadata of the PMA with the respective metadata of the commercial multimedia content 30 in the swap list 32 or the scene list 64. For example, metadata related to an object type of a still image in the commercial multimedia content 30 may be swapped with PMA related to an object type of a still image. Thus, generating the session composition list 36 (use case block 208) may include accessing the PMA (use case block 206). Once the session composition list 36 is generated in the scenario where commercial multimedia content 30 is used, the session composer 20 may compose the blended multimedia 38 with the session composition list 36 (use case block 210). In the scenario where commercial multimedia content 30 is not used, the session composer 20 may compose the blended multimedia 38 after the scene list 64 is generated. Composing the blended multimedia 38 (use case block 210) may include accessing the PMA (use case block 206) to fetch the identified PMA to swap with commercial multimedia content 30 or to arrange in the virtual environment. After composed, the session composer 20 may output the blended multimedia 38 for user 40 consumption.

The user input 22 component may monitor the user 40 interaction (use case block 214). The user 40 may interact with the blended multimedia 38 using any suitable device including the controller 42. For example, the user 40 may use a controller, mouse, or the like to press a key or click a button over a certain aspect of an object (character) displayed on the blended multimedia 38. Additionally or alternatively, the user may directly press on the object (character) if the blended multimedia 38 is displayed on a touchable screen device (e.g., tablet). In one scenario, the user 40 (e.g., a child) may press a key, touch a screen, or a similar interaction on the controller 42 and the user input 22 may detect the user interaction and trigger a linked response. The user input 22 may also monitor the user's enjoyment (use case block 216). In some embodiments, the user input 22 may detect user enjoyment from the controller 42 and the contextual analyzer 16 may generate the virtual environment and/or modify the virtual environment with PMA based on the detected enjoyment or lack thereof.

FIG. 10 illustrates a more detailed view of the swap list 32, in accordance with an embodiment. In some embodiments, the swap list 32 may be generated by the front-end processor 14 when commercial multimedia content 30 is used. The swap list 32 may include a header 220 and a body 222. The header 220 may include the name of the commercial multimedia content 30, the scene that is being modified, the location of the scene, the time of the scene, among other things. The body 222 may include information related to the object to swap out, the placement of the object in the scene, the object to swap in, and so forth. For example, objects to swap out may include, soundtracks, photographs, a lamp, a couch, cushions, throw blankets, rugs, televisions, and the like. The placement of the soundtrack may include the opening scene, bridge sequences, ending credits, or any suitable location throughout the scene. The object to replace the soundtrack with may be selected randomly or based on listening habit statistics from PMA (music file) from the user's collection. The placement of the photographs may include any suitable location in the scene, such as a shelf on a back wall, a photograph frame on the right of a stage, and so forth. The photograph to swap with the identified photograph in the commercial multimedia content 30 may include PMA (still image) from the user's collection and/or a still image selected based on the user's preferences.

Moreover, another object to swap out may include furniture or objects located in a room, such as a lamp, a couch, cushions, throw blankets, rugs, televisions, and so forth. The objects to swap in to replace the previous objects may be selected from the user's PMA or they may be selected from commercial retailers. For example, the commercial retailer may provide a product unique identifier and retailer uniform resource locator (URL) so that the session composer 20 knows where to locate the object on the Internet. The objects selected from the commercial retailers may be chosen based on the user's décor/design preferences, browsing and purchasing history, and so forth.

Figure 11:
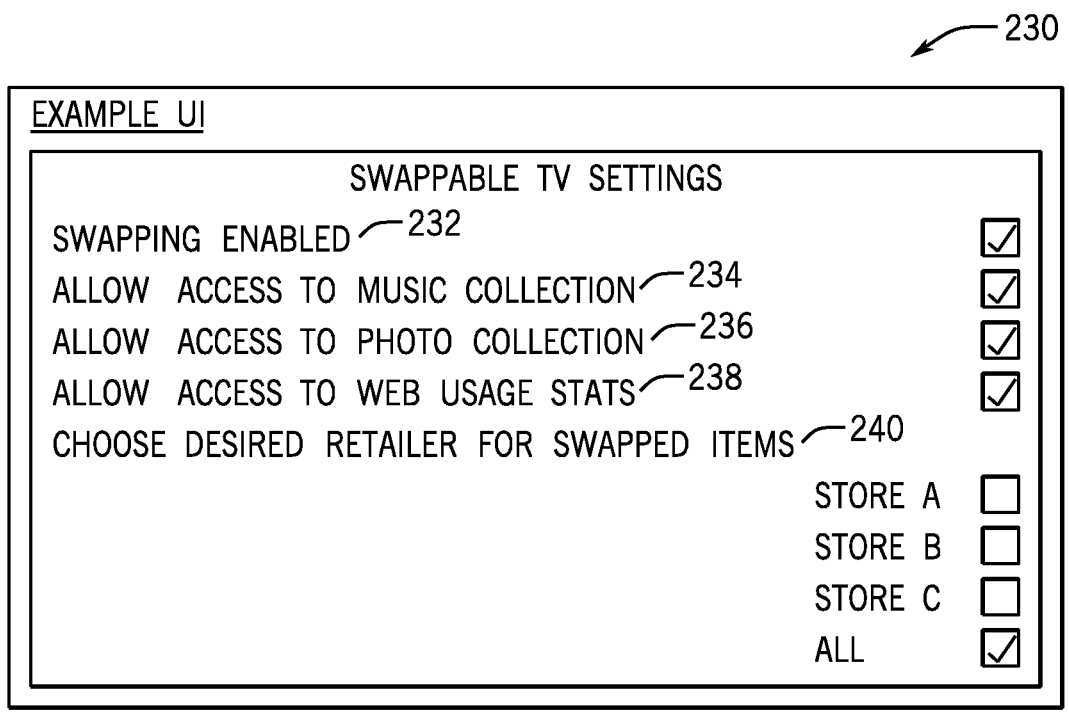
FIG. 11 illustrates a graphic user interface (GUI) for configuring swappable settings, in accordance with an embodiment.

FIG. 11 illustrates a graphic user interface (GUI) 230 for configuring swappable settings, in accordance with an embodiment. The GUI 230 may be accessed by the user 40 at any time to modify the swappable settings. The swappable settings may include enabling swapping 230, allowing access to the user's music collection (audio PMA) 234, allowing access to the user's photograph selection (still image PMA) 236, allowing access to the user's Internet usage (browsing and purchasing history PMA) 238, and/or choosing desired commercial retailer for swapped items (e.g., store A, store B, store C, or all). Additionally or alternatively, the GUI 230 may include settings for allowing generation of virtual environments when commercial multimedia content 30 is not used, accessing the user's social media profile, allowing advertisements from external sources 66, allowing setting the display priority flag, and so forth. Indeed, one skilled in the art may appreciate that any of the techniques provided in the present disclosure may be configured in any suitable manner using the GUI 230.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A computer-implemented method of blending multimedia with a multimedia composition system, comprising:
   generating a swap list by identifying potential match points of objects, scenes, or assets, in a multimedia template that are capable of being replaced with personal multimedia assets (PMA) in a user's collection, wherein the potential match points comprise metadata attributes of the objects, scenes, or assets to be matched with metadata of the PMA;
   identifying particular PMA of the PMA in the user's collection, by identifying the particular PMA having a threshold number of matches between the potential match points and metadata of the particular PMA;
   generating a composition list based on the swap list and the particular PMA by designating the particular PMA to replace at least a portion of the objects, scenes, or assets in the multimedia template identified in the swap list; and
   composing from the multimedia template and the designated particular PMA, blended multimedia using the composition list by:
      swapping the at least the portion of the objects, scenes, or assets in the multimedia template with the designated particular PMA, wherein the designated particular PMA comprises a three-dimensional (3D) model; and
      altering one or more visual characteristics of the designated particular PMA to match corresponding characteristics of the multimedia template, wherein the altering of the one or more visual characteristics of the designated particular PMA comprises adjusting the 3D model to a configuration having metadata corresponding to the one or more visual characteristics.

2. The method of claim 1, wherein the multimedia template comprises commercial multimedia content or a virtual environment.

3. The method of claim 2, wherein generating the swap list is performed by a front-end processor component using the commercial multimedia content, generating the composition list is performed by a user agent component using the swap list, and composing the blended multimedia is performed by a session composer component using the composition list.

4. The method of claim 1, wherein generating the swap list comprises parsing a metadata table received with the multimedia template and separating elements in the metadata table into a table included in the swap list comprising an identified object, scene, or asset in the multimedia template to swap out, a placement of the object, scene, or asset displayed in the multimedia template, and a suggested object, scene, or asset to swap in at the placement from either the PMA or a commercial retailer.

5. The method of claim 1, wherein the PMA comprises still images, two-dimensional (2D) images, 3D models, videos, animations, audio, text, or some combination thereof.

6. The method of claim 1, wherein composing the blended multimedia further comprises:
   fetching the particular PMA identified in the composition list from one or more data repositories,
   composing objects in the particular PMA that have been fetched,
   identifying visual objects included in the multimedia template based on metadata, graphically blending, overlaying, or some combination thereof, the composed objects at their corresponding placements identified in the composition list, wherein the graphically blending the composed objects comprises the altering one or more visual characteristics of the designated particular PMA, separating audio in the multimedia template, identifying and substituting caption or text fields with appropriate text from the particular PMA that has been fetched, rendering the blended multimedia, and setting triggers for user interaction.

7. The method of claim 1, comprising displaying a graphical-user interface (GUI) that enables configuration of swappable settings comprising enabling swapping, allowing access to a user's music collection, allowing access to a user's photograph collection, allowing access to a user's web usage statistics, and choosing desired commercial retailers for swapped objects.

8. The method of claim 1, comprising outputting the blended multimedia for user consumption, to monitor for user interaction, and to trigger appropriate responses based on certain interactions.

9. A tangible, non-transitory computer-readable medium storing computer instructions thereon, the computer instructions, when executed by a processor, configured to:

generate a swap list by identifying potential match points of objects, scenes, or assets, in a multimedia template that are capable of being replaced with personal multimedia assets (PMA) in a user's collection, wherein the potential match points comprise metadata attributes of the objects, scenes, or assets to be matched with metadata of the PMA;

identify particular PMA of the PMA in the user's collection, by identifying the particular PMA having a threshold number of matches between the potential match points and metadata of the particular PMA;

generate a composition list based on the swap list and the particular PMA by designating the particular PMA to replace at least a portion of the objects, scenes, or assets in the multimedia template identified in the swap list; and compose from the multimedia template and the designated particular PMA, blended multimedia using the composition list by:

swapping the at least the portion of the objects, scenes, or assets in the multimedia template with the designated particular PMA, wherein the designated particular PMA comprises a three-dimensional (3D) model; and altering one or more visual characteristics of the designated particular PMA to match corresponding characteristics of the multimedia template, wherein the altering of the one or more visual characteristics of the designated particular PMA comprises adjusting the 3D model to a configuration having metadata corresponding to the one or more visual characteristics.

10. The computer-readable medium of claim 9, wherein the multimedia template comprises a virtual environment, the composition list comprises a scene list including PMA and advertisements based on a user's personal information and preferences, and the instructions are configured to:

output the blended multimedia for user consumption;

monitor a user's enjoyment level of the virtual environment by using facial scanning, neural scanning, galvanic skin response, heart rate detection, breathing rate detection, or some combination thereof; and use machine learning to determine correlations between enjoyment or lack of enjoyment with the blended multimedia and a user's mood.

11. The computer-readable medium of claim 10, wherein the instructions are configured to generate a different scene list with different PMA and advertisements when the lack of enjoyment is determined.

12. The computer-readable medium of claim 10, wherein the instructions configured to monitor the user's enjoyment level comprises instructions for receiving signals indicative of a measured parameter from one or more wearables, sensors, controllers, or some combination thereof.

13. The computer-readable medium of claim 10, wherein the instructions configured to use machine learning to determine correlations between enjoyment or lack of enjoyment with the blended multimedia comprises instructions for associating the user's enjoyment level or lack of enjoyment level with the PMA and advertisements in the virtual environment.

14. The computer-readable medium of claim 13, wherein the instructions are configured to tailor the virtual environment with PMA according to the user's detected mood based on past correlations of PMA and enjoyment level while in that mood.

15. The computer-readable medium of claim 10, wherein the instructions are configured to select the advertisements to be included in the scene list when a display priority flag associated with the advertisement is set to true or not null and the advertisements with the display priority flag set to true or not null override any PMA selected at a particular placement in the virtual environment.

16. The computer-readable medium of claim 10, wherein the instructions are configured to select the PMA and the advertisements based on a user's web browsing history, web purchasing history, social media profile, viewing habits, listening habits, and psychological profiling.

17. A multimedia composition system, comprising:

a front-end processor configured to generate a swap list by identifying potential match points of objects, scenes, or assets, in a multimedia template that are capable of being replaced with personal multimedia assets (PMA) in a user's collection, wherein the potential match points comprise metadata attributes of the objects, scenes, or asserts to be matched with metadata of the PMA, and by identifying particular PMA of the PMA in the user's collection, by identifying the particular PMA having a threshold number of matches between the potential match points and metadata of the particular PMA;

a user agent configured to generate a composition list based on the swap list and the particular PMA by designating the particular PMA to replace at least a portion of the objects, scenes, or assets in the multimedia template identified in the swap list; and a composer configured to compose from the multimedia template and the designated particular PMA, blended multimedia using the composition list by:

swapping the at least the portion of the objects, scenes, or assets in the multimedia template with the designated particular PMA, wherein the designated particular PMA comprises a three-dimensional (3D) model; and altering one or more visual characteristics of the designated particular PMA to match corresponding characteristics of the multimedia template, wherein the altering of the one or more visual characteristics of the designated particular PMA comprises adjusting the 3D model to a configuration having metadata corresponding to the one or more visual characteristics.

18. The multimedia composition system of claim 17, wherein the particular PMA is accessed using an application-programming interface including a function to read data in one or more data repositories locally, externally, or in a cloud environment.

19. The multimedia composition system of claim 17, wherein the metadata of the particular PMA comprises a descriptive name, identifier, type of content including audio, video, text, still image, and 3D model, associated encoding parameters including resolution, bitrate, codec, and duration, scene-level information including objects, location, orientation, and lighting, interact-able actions including playing sound, animation, and changing color.

20. The method of claim 1, wherein when none of the metadata of the PMA satisfies the threshold number of matches, no particular PMA is designated to replace the at least the portion of the objects, scenes, or assets in the multimedia template.

21. The method of claim 1, wherein the one or more visual characteristics of the designated particular PMA matched with the corresponding characteristics of the multimedia template comprise lighting, a camera angle, resolution, brightness, or a combination thereof.

* * * * *